United States Patent Office 3,506,733
Patented Apr. 14, 1970

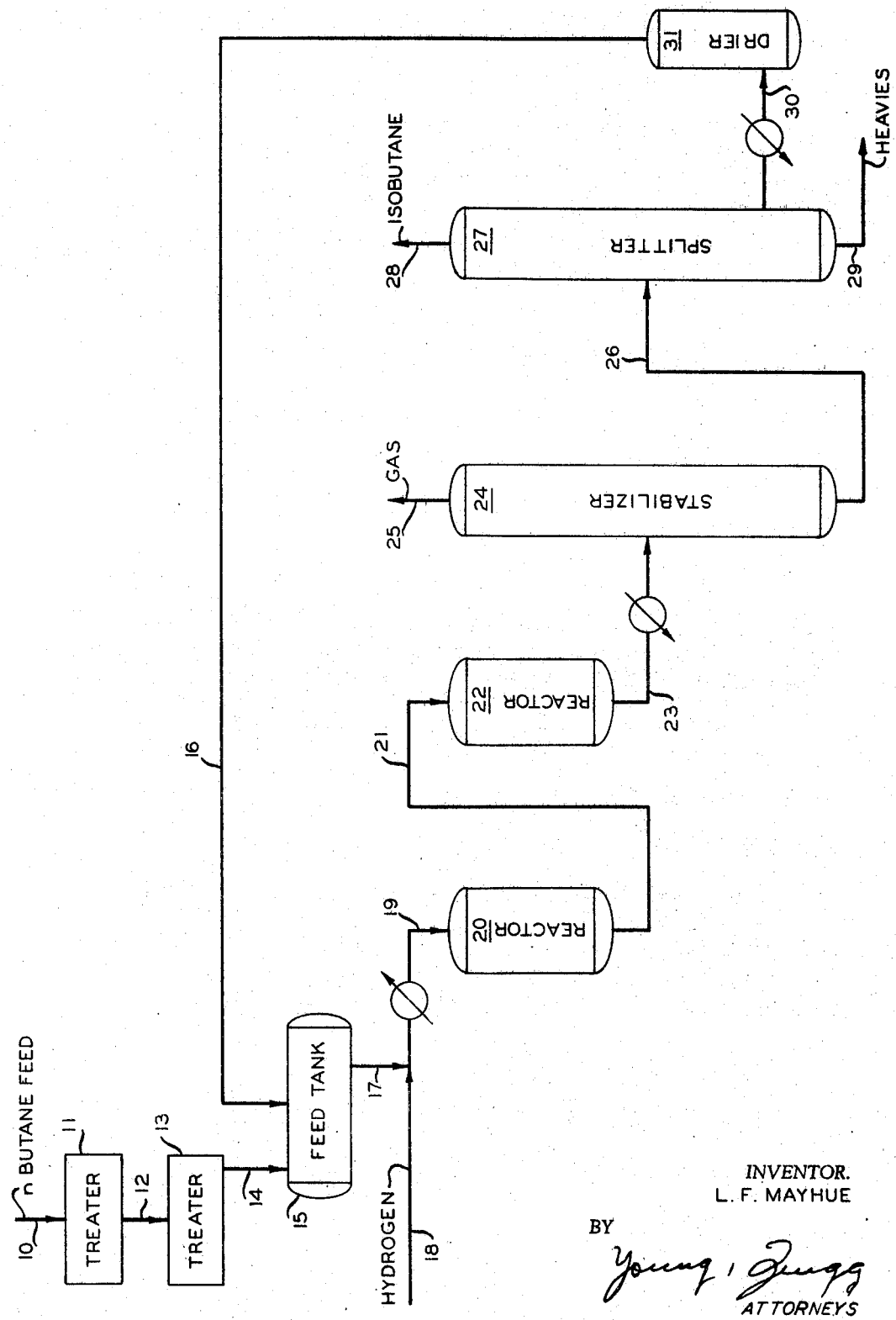

3,506,733
HYDROISOMERIZATION WITH DRYING OF RECYCLE STREAM
Luther F. Mayhue, Bartlesville, Okla., assignor to Phillips Petroleum Company, a corporation of Delaware
Filed Feb. 1, 1968, Ser. No. 702,235
Int. Cl. C07c 5/24, 5/28
U.S. Cl. 260—683.68                               3 Claims

ABSTRACT OF THE DISCLOSURE

In the catalytic isomerization of normal paraffins to isoparaffins the feed is contacted serially with at least two different solid adsorbent materials to remove contaminants and then with spent isomerization catalyst prior to subjecting to isomerization, together with drying of recycle normal paraffin by contacting with a molecular sieve.

Background of the invention

The present invention relates to a process for the catalytic isomerization of paraffinic hydrocarbons. In accordance with another aspect, it relates to the catalytic isomerization of normal paraffinic hydrocarbons having at least 4 carbon atoms in the molecule wherein feedstocks predominating in these types of hydrocarbons are subjected to the action of hydroisomerization catalysts following pretreatment for the removal of catalyst poisons. In accordance with a further aspect, this invention relates to a process for the purification of paraffinic feed hydrocarbons for hydroisomerization units and recycle of unreacted normal paraffin by contacting with separate beds of solid absorbents selected for removing catalyst contaminants.

The isomerization of aliphatic paraffins is an important procedure in the petroleum and chemical industries. For example, it is important in the petroleum industry for converting straight chain paraffins or singly branched paraffins to their more highly branched isomers of higher octane rating. It is known to isomerize paraffins in the presence of hydrogen and platinum-type catalysts.

In normal practice, catalyst poisons such as moisture find their way into the process system. The presence of moisture within an isomerization system is a serious problem in catalytic reaction systems where water is a catalyst poison. The present invention relates to an improved process whereby catalyst poisons are removed from the various feed and recycle streams prior to subjecting to isomerization conditions.

While the present invention is applicable to any such system, for purposes of illustration, it will be described in terms of a system for isomerizing normal butane to isobutane utilizing a catalyst comprising alumina, platinum, and combined halogen, with hydrogen chloride being utilized as a catalyst promoter. The aluminum-platinum-halogen catalyst is particularly sensitive to the presence of water.

Accordingly, an object of this invention is to provide an improved procedure for conducting an isomerization process.

Another object of this invention is to provide a system for preserving the effective activity of active catalyst and for prolonging the life of the catalyst.

A further object of this invention is to provide a procedure whereby the streams subjected to isomerization are purified of catalyst contaminants prior to subjecting to isomerization.

Other aspects, objects, and the several advantages of this invention are apparent from a study of the specification, the drawing, and the appended claims.

Summary of the invention

In accordance with the invention, it has been found that an improved hydroisomerization process is provided for normal paraffins over supported platinum-aluminum chloride-type catalysts if the paraffinic feed is sequentially contacted with different adsorbents and spent catalyst prior to contacting with active catalyst, together with drying of recycle unreacted paraffin for combining with the isomerization feed. It has been found that catalyst contaminants are substantially eliminated by so operating.

By using two reactors alternately in series with each other to take advantage of the guard or clean-up action of the spent isomerization catalyst, it is possible to increase the production of isomer substantially per pound of catalyst compared to operations not utilizing spent catalyst for contacting of paraffin feed. Catalyst which is spent for further isomerization use, is utilized for treating out catalyst poisons from the process feed stream. These poisons are mainly trace quantities of water and sulfur compounds, but may be materials such as nitrogen compounds, fluorides, and metallic poisons such as lead, copper, mercury, etc. These materials act to deactivate the active portion of the bed and tend to be cumulative in their action and provoke a permanency in their damage to the catalyst.

The decrease in activity of catalyst is of serious economic consideration because it results in less conversion of the normal butane to isobutane. This decreases the productivity and efficiency of the process and could be serious enough (due to the catalyst's extreme sensitivity) to cause the whole unit to be uneconomical to operate. These poisons which cause permanent catalyst damage decrease the operating life of the catalyst and hasten the time that a new catalyst bed is needed. Since this catalyst is a platinum-aluminum chloride catalyst, its replacement incurs considerable expense. As the catalyst becomes inactive, an increase in reactor bed temperature is necessary to promote catalyst activity. This increased bed temperature promotes hydrocracking, which increases gas make and decreases hydrogen recycle purity, necessitating an increase in hydrogen recycle volume. An increase in the temperature level of the unit will naturally increase operating costs in the form of excessive utility costs.

Further in accordance with this invention, recycle unreacted normal paraffin recovered from the isomerization effluent is contacted with a molecular sieve to purify prior to combining with the isomerization feed and contacting with isomerization catalyst. This molecular sieve bed protects the whole isomerization unit from any water coming from the butane separation following isomerization. This water may have as its source a leak in the steam bundle in the column reboiler or may stem from the inherent difficulty of completely drying out the column after column shut-down or turnaround. Moisture in the recycle butane has been extremely troublesome in the past. This guard chamber bed or molecular sieve will shorten start-up time spent in drying operations when bypassing the sidedraw from the butane splitter column to the feed dryers.

Description of preferred embodiment

Referring now to the drawing, there is set forth a schematic representation of a catalytic reaction system for converting normal butane to isobutane. A normal butane feed stream is passed by way of line 10 into treater 11.

The charge stocks to which this procedure applies include aliphatic paraffins in the $C_4$ to $C_7$ range. The charge stock can be a substantially pure fraction of n-butane, n-pentane, n-hexane or n-heptane, or it can be a refinery fraction predominating in one of these n- paraffins and containing minor amounts of other hydrocarbons at similar boiling points. It can also be a mixture of two or more of these n-paraffins or of fractions predominating therein. Most suitably, charge stock is a refinery fraction that consists predominantly of one or more of the n-paraffins plus minor amounts of other hydrocarbons of similar boiling range that would normally be present in light, straight-run petroleum fractions or in natural gasoline fractions or in paraffin fractions recovered from conversion processes such as catalytic cracking.

Treater 11 contains a bed of the usual drying agents such as bauxite, silica gel, activated alumina, and the like. Bauxite is presently preferred as the adsorbent material employed in treater 11.

The normal butane feed reduced in contaminats removed from treater 11 by way of line 12 is passed to treater 13. Treater 13 contains a molecular sieve material. Molecular sieve materials are composed crystalline, sodium and calcium alumino-silicates which have been heated to remove their water of hydration.

Molecular sieve materials which may be used in the process are usually comprised of sodium, calcium, aluminum, silicon, and oxygen, and are a structure of definite crystalline pattern containing a large number of small cavities connected by a number of smaller pores. These pores and cavities are normally uniform in size and comprise about 50 percent of the total volume of the crystals. Such sieve materials applicable in the invention are various naturally occurring zeolites or synthetic zeolites. Applicable materials are the various crystalline alumino-silicates which have been heated to remove water of hydration. Of the three classes of crystalline, zeolites, fibrous, laminar, and rigid three dimensional anionic networks, the last mentioned class only is suitable in this invention. Examples of such materials include habazite, phacolite, gmelinite, harmotome, and the like, or suitable modifications thereof. The particular sieve used in the example of this invention is known to those skilled in the art as Linde Molecular Sieve Type 5A. Of course, other pore size sieves may be used, e.g., 4 Angstroms up to, say, 13 Angstrom size.

The dried normal butane feed is withdrawn from treater 13 by way of line 14 and passed to feed tank 15. Recycle normal butane recovered from the isomerization effluent to be described hereinbelow is introduced into feed tank 15 by way of line 16.

Isomerization feed comprising liquid normal butane is pumped (not shown) from tank 15 by way of line 17, and with previously dried hydrogen introduced by way of line 18, and is vaporized in heat exchanger (not numbered) and passed by way of line 19 into isomerization reactor 20, which contains spent hydroisomerization catalyst.

Paraffinic feed further reduced in contaminants is removed from reactor 20 containing spent isomerization catalyst by way of line 21 and passed to reactor 22 containing an active platinum-aluminum chloride-type isomerization catalyst. In reactor 22 a substantial portion of the normal paraffin, e.g., n-butane, is converted to isoparaffin, e.g., isobutane.

Platinum-aluminum chloride-type catalysts that can be employed according to the invention include those that have been employed previously in catalytic reforming. These catalysts comprise a minor amount of a platinum group metal deposit on a support such as alumina or silica-alumina and normally contain a small amount of chlorine which is incorporated when the catalyst is prepared from noble metal halides. The catalyst may also contain added amounts of chlorine or other halogens, especially fluorine. A suitable isomerization catalyst, for example, is one comprising a major portion of alumina from about 0.01 to about 1 weight percent of platinum and from about 0.1 to about 10 weight percent of combined halogen, a portion of which is in the form of $AlCl_3$.

The isomerization reaction effluent is withdrawn from reactor 22 by way of line 23, and is partially condensed in exchanger (not numbered) and introduced into stabilizer 24 (reflux not shown). The vaporous components of the reaction effluent are withdrawn from separator 24 by way of line 25, and this gas stream includes hydrogen, primarily, which can be recycled if desired for reuse in the process. The liquid components of the reactor effluent are withdrawn from separator 24 by way of line 26 and passed to splitter 27 (reflux not shown). An overhead stream comprising isobutane is removed from splitter 27 by way of line 28 and heavier components as bottoms by way of line 29. A liquid side stream comprising n-butane is removed by line 30, is cooled in exchanger (not numbered) and passed to molecular sieve dryer 31 which contains any suitable known molecular sieve, as described above, selected for the removal of moisture, in particular, from normal paraffin. Dried n-butane for recycle is passed by way of line 16 to feed tank 15 for further processing as described above.

Reactor 22 is maintained under isomerization conditions which generally include a temperature in the range of about 300° F. to about 950° F. and a pressure in the range of about 15 to about 1500 p.s.i.a.

SPECIFIC EXAMPLE

| Operating Conditions | Pressure, p.s.i.a. | Temperature, °F. |
|---|---|---|
| Bauxite Treater (11) | 100 | 85 |
| Molecular Sieve Unit (13) | 95 | 90 |
| Feed Tank (15) | 90 | 95 |
| Pre-reactor (20): | | |
| Inlet | 495 | 330 |
| Outlet | 485 | 345 |
| Reactor (22): | | |
| Inlet | 485 | 345 |
| Outlet | 475 | 375 |
| Stabilizer (24): | | |
| Top | 310 | 190 |
| Bottom | | 235 |
| Splitter (27): | | |
| Top | 140 | 150 |
| Bottom | | 185 |
| Molecular Sieve Unit (31) | 95 | 90 |

FEED RATES, THOUSANDS GALLONS/DAY*

Prior System Without Unit 31

| Stream Component | (10) | (14) | (16) | (17) | (18) | (25) | (28) | (29) | (30) |
|---|---|---|---|---|---|---|---|---|---|
| Hydrogen* | | | | | 11,500 | 11,150 | | | |
| Light Hydrocarbons* | | | | | 2,500 | 4,000 | | | |
| Isobutane | 12 | 12 | 10 | 22 | | | 306 | | 10 |
| Normal Butane | 330 | 330 | 286 | 616 | | | | 12 | 286 |
| Heavy Hydrocarbons | | | | | | | | 1 | |
| Water* | (¹) | 0.3 | 1.2 | 0.7 | 0.3 | (²) | (²) | (²) o | 1.2 |

Improved System with Unit 31

| Stream Component | (10) | (14) | (16) | (17) | (18) | (25) | (28) | (29) | (30) |
|---|---|---|---|---|---|---|---|---|---|
| Hydrogen* | | | | | 11,500 | 11,150 | | | |
| Light Hydrocarbons* | | | | | 2,500 | 4,000 | | | |
| Isobutane | 12 | 12 | 10 | 22 | | | 306 | | 10 |
| Normal Butane | 330 | 330 | 286 | 616 | | | | 12 | 286 |
| Heavy Hydrocarbons | | | | | | | | 1 | |
| Water* | (¹) | 0.3 | 0.1 | 0.3 | 0.3 | (²) | (²) | (²) | 1.2 |

¹ Saturated.  ² Net measured.

Without unit 31, only 180 barrels of normal butane feed was hydroisomerized to isobutane per pound of hydroisomerization catalyst before the catalyst was spent. Operating in accordance with the invention, using molecular sieve drier zone 31, 394 barrels of normal butane have been isomerized to isobutane per pound of the same type hydroisomerization catalyst, and the catalyst is still being used. It is estimated that 450 to 500 barrels of normal butane will be isomerized before the catalyst will be spent.

Specific catalyst for hydroisomerization

Aluminum oxide base: platinum was 0.37 weight percent, $AlCl_3$ was 4.1 weight percent; fluorine (combined) was 0.02 weight percent.

Molecular sieve used in unit (13) and (31)

13 X Linde Molecular Sieve.

Water in the process comes from start-up and leakage, from the fresh hydrocarbon feed, and from the hydrogen charged to the system.

In plant operations the reactor effluent 23 is cooled and passed to a product separator to remove the hydrogen stream for recycle. For simplification, the product separator is not shown, and the overhead 25 from the stabilizer 24 includes this hydrogen stream.

I claim:
1. A hydroisomerization process which includes drying of recycle normal paraffin prior to subjecting same to hydroisomerization to increase substantially the yield of isoparaffin per pound of hydroisomerization catalyst which comprises
   (a) subjecting a normal paraffin feed to successive treatments by passing same through beds of driers and molecular sieves to remove moisture and other contaminants from the feed,
   (b) introducing said treated feed into a feed surge zone,
   (c) removing said feed from said surge zone and combining with hydrogen and passing same first through a spent bed of alumina-platinum-combined halogen hydroisomerization catalyst to further purify the feed and then through an active bed of alumina-platinum-combined halogen hydroisomerization catalyst maintained at isomerization conditions to convert said paraffin at least in part to an isoparaffin,
   (d) removing an effluent mixture containing said normal paraffin and said isoparaffin from the active bed of catalyst and separating same into separate streams of normal paraffin and isoparaffin, and
   (e) recycling said normal paraffin stream to said surge zone, said stream being passed through a molecular sieve bed to dry same prior to combining said stream with the treated normal paraffin feed of step (a).

2. A process according to claim 1 wherein said normal paraffin feed is first contacted with bauxite and then a molecular sieve prior to introduction into said feed surge zone.

3. A process according to claim 1 wherein said normal paraffin is n-butane and said hydroisomerization catalyst is an alumina-platinum-combined chloride catalyst.

References Cited

UNITED STATES PATENTS

| | | | |
|---|---|---|---|
| 2,365,917 | 12/1944 | Thomas | 260—683.68 |
| 2,368,733 | 2/1945 | Watson | 260—683.74 |
| 2,436,900 | 3/1948 | Roberts | 260—683.74 |
| 3,299,165 | 1/1967 | Abrahamson | 260—683.68 |

DELBERT E. GANTZ, Primary Examiner

G. J. CRASANAKIS, Assistant Examiner